United States Patent [19]

Rasmussen

[11] Patent Number: 4,636,417
[45] Date of Patent: Jan. 13, 1987

[54] FIBROUS RETICULAR SHEET MATERIAL

[76] Inventor: Ole-Bendt Rasmussen, Forchwaldstrasse 23, Walchwil/Zug CH-6318, Switzerland

[21] Appl. No.: 701,809

[22] Filed: Feb. 19, 1985

Related U.S. Application Data

[60] Continuation of Ser. No. 428,803, Sep. 30, 1982, abandoned, which is a division of Ser. No. 284,685, Jul. 20, 1981, Pat. No. 4,377,544, which is a continuation of Ser. No. 179,708, Aug. 20, 1980, abandoned, which is a continuation of Ser. No. 7,713, Jan. 30, 1979, abandoned, which is a continuation of Ser. No. 841,480, Oct. 12, 1977, abandoned, which is a continuation of Ser. No. 639,007, Dec. 9, 1975, abandoned.

[51] Int. Cl.[4] .......................... B05D 5/12; B44D 1/20
[52] U.S. Cl. ..................................... 428/91; 428/131; 428/134; 428/136; 428/138
[58] Field of Search ............... 428/134, 131, 136, 138, 428/91; 264/DIG. 81

[56] References Cited

U.S. PATENT DOCUMENTS

| 1,417,587 | 5/1922 | Tully | 428/91 |
| 3,399,425 | 9/1968 | Lemelson | 18/10 |
| 3,708,565 | 1/1973 | Seiffert | 264/88 |
| 3,811,923 | 5/1974 | Hammer et al. | 428/91 |
| 4,000,230 | 12/1976 | Brendel et al. | 264/37 |
| 4,232,073 | 11/1980 | Okamoto | 428/91 |

Primary Examiner—Nancy Swisher
Attorney, Agent, or Firm—William J. Daniel

[57] ABSTRACT

A two-dimensional integral net having a nap in form of relatively long fibres which are integral with the net and protrude from the edges which surround the apertures of the net.

A method of producing this net from a film is by heating selected areas of the film to a molten state and dragging out this molten material into fibres to leave apertures in the film while controlling the fibre-dragging by cooling with an air jet.

4 Claims, 11 Drawing Figures

FIBROUS RETICULAR SHEET MATERIAL

This is a continuation of Ser. No. 428,803, filed Sept. 30, 1982, now abandoned, which is a division of Ser. No. 284,685, filed July 20, 1981, now U.S. Pat. No. 4,377,544 issued Mar. 22, 1983, which is in turn a continuation of Ser. No. 179,708, filed Aug. 20, 1980, now abandoned, which was in turn a continuation of Ser. No. 7,713, filed Jan. 30, 1979, now abandoned, which was in turn a continuation of Ser. No. 841,480, filed Oct. 12, 1977, now abandoned, and which was in turn a continuation of Ser. No. 639,007, filed Dec. 9, 1975, now abandoned.

BACKGROUND OF THE INVENTION

The invention relates to nets or netlike products directly produced from a thermoplastic film. Nets of this kind are often used as reinforcement in paper articles or textiles e.g. in sanitary paper articles. They are further used in heavy duty bags, paper cloth, and nonwoven upholstery fabrics. In many cases, however, the utility of such nets is limited due to lack of textile feel and/or cover.

Thus, in sanitary articles where the net is in direct contact with the body the surface of the net can irritate the skin. Also the relatively hard and smooth surface of the net gives some limitations to its use e.g. as backing in thick carpets.

One object of the present invention is to overcome such drawbacks in nets produced directly from film.

Methods are known that provide sheets of continuous structure with a napped surface by casting or rolling the material in a mould that is a negative replica of the desired nap-surface. However, if a fine nap is desired, this method requires the polymer to be in very low-viscous state. Besides, the notch effect highly reduce the strength of the sheet.

It is a second object of the invention to overcome these drawbacks and provide for a simple and convenient method for manufacturing a napped net directly from film.

Other objects of the invention will appear from the description.

SUMMARY OF THE INVENTION

The textile-like reticular product of the present invention consists of a body portion which forms a generally two-dimensional integral net structures and a surface portion which consists of fibres materially integral with and protruding at from at least (part, of the marginal edges of generally every aperture which is defined by the meshes of said net, such fibers being generally longer than any dimension of the hollow to which each fiber is adjacent.

This product is manufactured by direct conversion of thermoplastic film material, and the characteristic steps of the process according to the invention consist in engaging the film material with moving surface means which comprise heated spaced areas placed in a pattern according to a desired pattern in the reticular product, so as to at least partly melt the portions of the sheet engaged with said areas, and generally keeping the rest of the film solid, forming apertures in said molten parts of the film by pulling the sheet away from the said surface means, and thereby dragging the said molten portions into filaments integral with the rest of the film, while controlling said dragging by cooling with an air jet.

The protruding relatively long fibres serve to eliminate the flat film-like character of the net, giving it improved bulk, and an improved ability for binding with similar or other materials, together with a more pleasant appearance. The process can easily be carried out in an integrated manner with cheap and simple means. When suitable additional steps are taken—as it will be described—they also give the net a soft handle.

The product can easily be distinguished from those would be formed by a simple partial cutting-up of well-known net structures, since the latter could never exhibit the minimum length of protruding fibres defined above. Besides, it is easy to identify the protruding fibres manufactured by the present method, since the dragging in molten state produces a gradual tapering generally along each protruding fibre.

The number of fibres which form the "nap" (the protruding fibres) can with advantage be very much higher than the actual number of meshes or apertures.

If the protruding fibres of the invention are simple "tentacles" on the net, they should preferably have an average length many times the general mesh dimension of the net.

In a preferred embodiment, however, a substantial portion at least of the protruding fibres are not simple "tentacles" but are loop-formed, each protruding from different locations around the same hollow so as to bridge over the hollow. The loop-form serves to give the material further bulk and further capability for binding. In this case each fiber can with a similar effect be shorter.

In another preferred embodiment of the net product a substantial portion at least of the protruding fibres are fibres with branches. This also further improves e.g. the bulk and ability for binding.

The branching in question can start from one location on the net and at least a substantial portion of the protruding fibres can be interconnected through branching with at least one other similar fibre protruding from an adjacent position. Such interconnected fibres can further form bridges over the hollow as described above so that the nap becomes web-formed.

As mentioned above, the process for the production of napped net involves engaging the film with advancing surface means which comprise heated spaced areas placed in a pattern adapted to a desired mesh pattern in the reticular product. In this connection, it is of course essential to maintain a net i.e., interconnected structure during the heat-opening of the film. One way of achieving this is to let the heated areas form a dotted pattern. This can e.g. be circular, square or polyhedric spots arranged in a regular pattern or in mutually staggered dotted lines. The unheated areas will thereby form a reticular pattern which is generally the pattern for the final base net.

Another way of maintaining a net structure is to let the heated areas form a linear pattern (which may be continuous over the length of the film or span over the full width of the film) and in combination herewith use a starting film which incorporated an array of higher melting filaments which are maintained generally solid during the heat dragging of the film. These higher melting filaments—and usually the surrounding regions of the matrix film polymer which remains adhered to said filaments during the heat opening—will thereby form one direction, while the film portions which are left (relatively) cold will form another direction of the net.

The higher melting filaments can be continuous or discontinuous. They can be incorporated by lamination between two films or incorporated by coextrusion, cf. the U.S. patent application, Ser. No. 380,418 of 1973, now abandoned, which also relates to heat-splitting of film with incorporated higher melting filaments.

Further, such filaments can be incorporated in a transverse (generally helical) direction by the extrusion apparatus schematically shown in FIGS. 7, 8 and 9 of U.S. Pat. No. 3,503,830, or by similar means. In such cases, the pattern of heated lines can be a continuous longitudinal pattern.

In a preferred embodiment of the method according to the invention, the molten portions (which are dragged out to form the fibers) are embossed prior to the fibre-forming pulling action. This embossment is carried out in order to initiate the fibre formation. If the bosses traverse the molten area all the way from one side to the other, a loop-formed, bridging nap can usually be formed at a suitable, relatively low temperature. Thus, the embossment also has the purpose to direct the form of fibres.

Further, the embossment can conveniently be in a pattern of linear mutually criss-crossing bosses. Hereby branching and/or web-formation of the protruding nap can be achieved.

There is always a certain tendency for the molten material to be torn off from the net due to sticking to the heated surface means, whereafter it is later in the conveying cycle joined with the film at random. Such spin-off is significantly reduced by the criss-crossing embossment which promotes branching and thereby gives each piece of fibre several ways of connection with the net.

For strength purposes, the net in its final state should preferably be strongly oriented. When a dense nap is preferable, at least a major proportion of the orientation is preferably carried out prior to the engagement with the heated surface means, while the material is still in film form.

As mentioned in the introduction, the invention has also for its object to provide improvements in the manufacture of napped film, and a method analogous to the abovementioned can with advantage be carried out on coextruded products, e.g. consisting of layers with different melting range. In this case the spaced or patterned areas contacting the heated surface are heated to a temperature at which the polymer in the layer with the lower melting range is molten or semimolten while the polymer in the other layer(s) is pronouncedly more solid. The resulting product may be a water impermeable sheet or film with a napped surface.

The napped film according to the invention can in the latter case consist of a body portion formed of ribs of lower melting polymer interconnected through a thinner web of higher melting polymer and another portion which consists of fibres materially integral with and protruding in dense rows from a part at least of those edges of the ribs which are adjacent to the cavities defined by the ribs and the webs, and being generally longer than the distance between adjacent ribs.

There is a close analogy between this structure and the reticular structure described in the foregoing (the web-connected ribs and the nets being both examples of interconnected, two-dimensional lattices), and the steps to achieve the nap are therefore also similar. The napped film is preferably cross-laminated, e.g. with a similar napped film with the ribs and the nap extending outwardly.

BRIEF DESCRIPTION OF THE DRAWINGS

The invention will now be described in further detail with reference to the drawings. For the sake of clarity, the nap is generally shown very short, while in reality it should be at least longer than the biggest dimension of the adjacent hollow in the net.

FIG. 1 is a net derived from a film (1) and with staggered hollows or apertures (2) edged by protruding filaments or naps (3). The arrow indicates the moving direction of the film during the process. The tapering of the protruding fibre is a result of the fibre dragging from molten state under cooling with an air jet.

In FIG. 2 the hollow producing device is a roller (4) provided with an array of staggered, thermally conducting parts (5) separated by thermally insulated, coherent parts (6). The roller (4) is heated while the counter-roller (7) is cold. FIG. 2 shows only part of the overall process line. The sheet or film (1) is extruded in any known manner from an extruder (not shown), and if convenient stretched between nip-rollers (not shown). The thermally conducting parts of roller 4 are made of a material which sticks to the film when the latter is heated to generally molten condition. The counter-roller (7), preferably with a smooth surface, has the purpose of placing the film (1) into flat face-to-face contact on the roller (4) to which it sticks until it is conveyed away over a rod (8) in any known manner. During this process, the parts (5) are heated to a temperature slightly above the melting range of the film material, while the parts (6) have a temperature below this. While contacting the roller (4), areas of the polymer film will stick to the heated regions (5) of the roller (4) and gradually become semimolten to molten, and the time of contact is selected to achieve such conditions while the interjacent areas of the film corresponding to the regions (6) will be kept in a solid state by simultaneously cooling the surface of the roller (4) with air from the two nozzles (11), so as to keep the parts (6) cooled.

Figure 1:
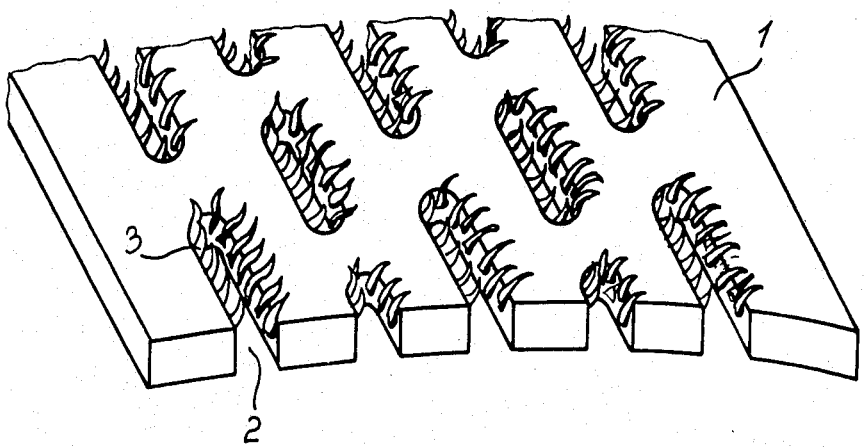
FIG. 1 schematically shows a napped netlike product according to the invention.

When the film is discharged over the pin (8), and cooling air as shown by (12) is blown directly against the zone of discharging, filaments or naps (3) will be dragged out from the sides of the hollows (2) that are now formed corresponding to the heated parts (5). A knife (10) cuts the naps (3) off at a convenient length.

Figure 3:
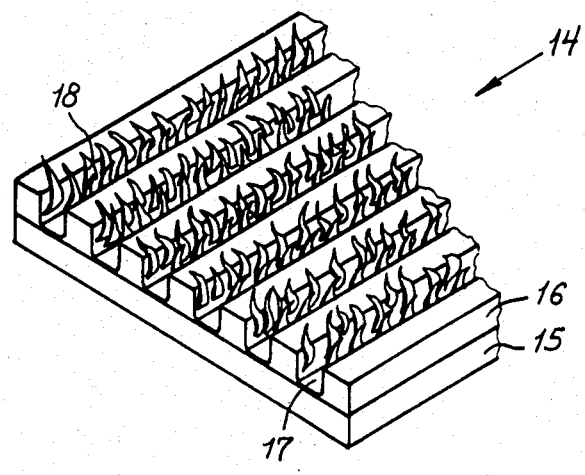

FIG. 3 is a napped netlike product derived from a laminated e.g. coextruded film (14) with a layer (15) of a material with melting range pronouncedly above the melting range of the other layer (16). The layer (16) is provided with parallel linear hollows (17) from the sides of which naps or filaments (18) are protruding, thus forming an array of filaments or filamentary strips on a continuous backing.

A similar product consisting of two criss-crossing arrays of filaments on a continuous backing is also available according to the invention.

Figure 4:
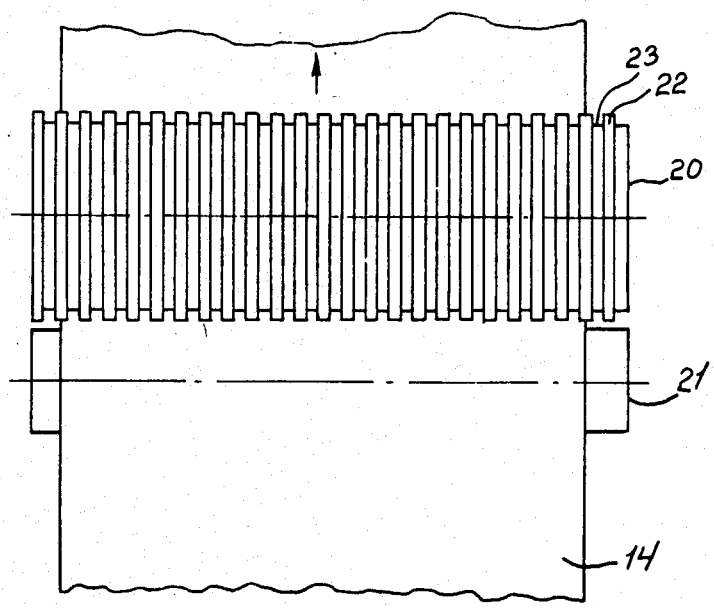
FIG. 4 shows a device suitable for producing the product shown in FIG. 3.

FIG. 4 is a frontal view of two rollers (20) and (21) constituting a preferred device for producing the laminated netlike product in FIG. 3. The hollow-forming parts of the roller (20) are in the shape of parallel circumferential rings (22) separated by grooves (23). The two rollers (20) and (21) function in the overall process-line analogously to the roller (4) and (7) in FIG. 2. However, it is not necessary to keep the grooves (23) cool during the process e.g. by air, as shown in FIG. 2, because of the continuous backing layer (15) with a higher melting range.

Figure 5:
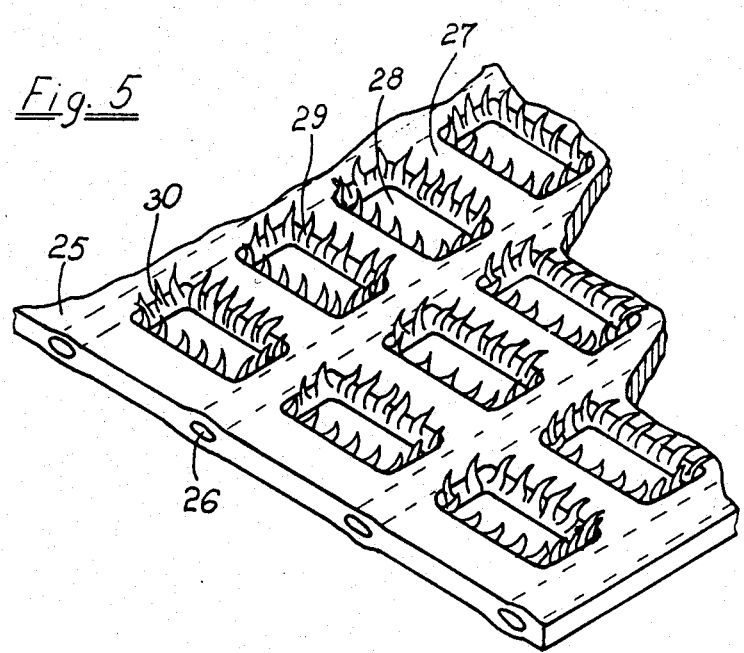
FIG. 5 shows a third napped netlike product according to the invention.

FIG. 5 is a napped scrim derived from a film (25) provided with incorporated coextruded longitudinal flat filaments (26) e.g. of nylon. The nylon threads form one array of the network and segments or stripe (27) of film material form the other array leaving hollows (28). Filaments or naps (29) protrude from the side of the lastmentioned strips, but as the nylon threads are surrounded by a certain amount of film material some naps (30) will protrude from the sides of the threads also.

Figure 2:
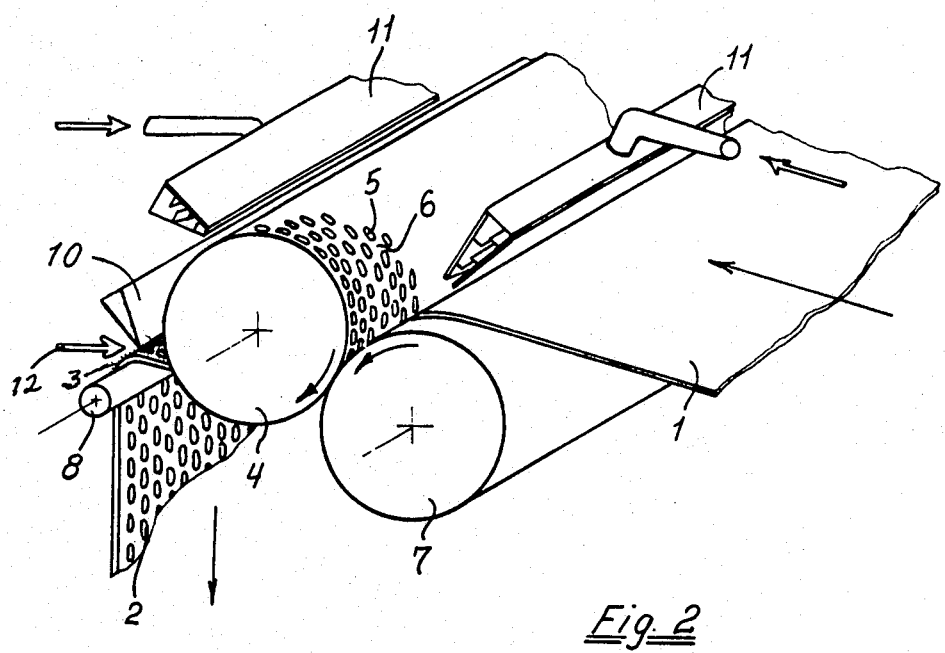
FIG. 2 shows a preferred embodiment of a partially heated device for producing the net shown in FIG. 1, FIG. 3 schematically shows another napped netlike product according to the invention.
Figure 6:
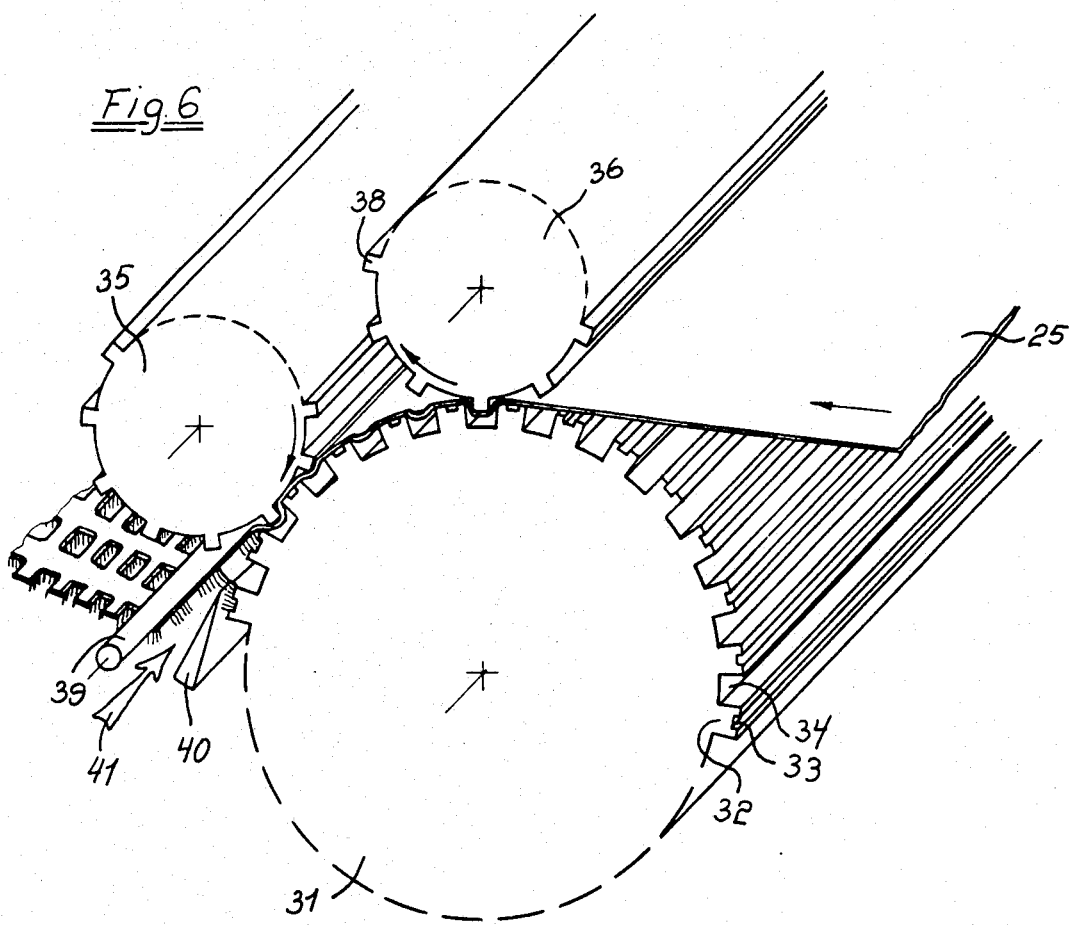
FIG. 6 shows a preferred device for producing the product shown in FIG. 5.
Figure 7:
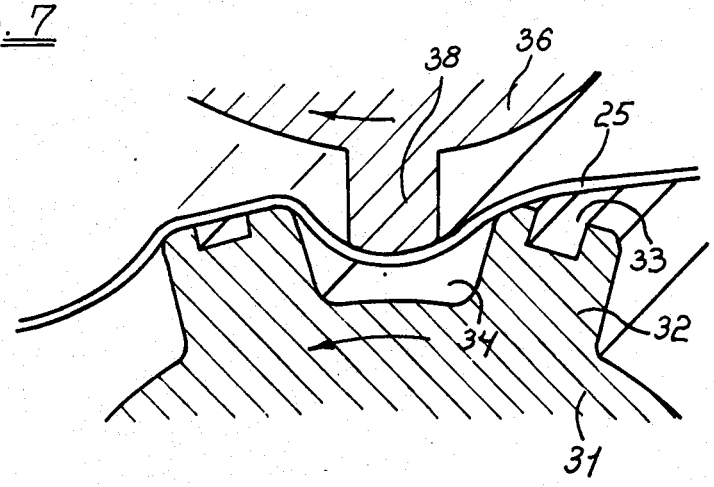
FIG. 7 shows in enlarged scale a part of FIG. 6.

FIG. 6 is a side view of the rollers constituting a preferred device for producing the net according to FIG. 5 from the starting film material incorporating the flat filaments (not visible in FIG. 6), and functioning in an overall process-line analogously to the rollers (4) and (7) in FIG. 2.

A heated roller (31) is provided with axially extending ribs (32), the ribs are provided with slots or channels (33) in the middle of the top, and are separated by grooves (34). Two counter-rollers (35) and (36) are shown, but there may be more according to the necessary length of contact between film (25) and roller (31). The rollers (35) and are (36) are cooled and provided on their surfaces with axially extending lands (38) that keep the strip-like film-parts of the resulting net cooled and solid during the aperture formation process. Like in FIG. 2, the net is discharged from the roller over a rod (39), while an air-jet (41) cools the dragging zone, and a knife (40) cuts off the dragged filaments in convenient lengths.

The temperature of the ribs (32) is chosen so that it lies slightly above the melting range of the film material, but under the melting range of the coextruded filamental threads (26) (not apparent in FIG. 6) e.g. of nylon.

When the film (25) leaves the extruder (not shown) it may be stretched longitudinally, but should advantageously be stretched transversely in a tenter frame before the hollow formation. In this way the napping will become denser in the final product compared to the density of the naps if the stretching is effectuated after the napping process. Besides it is advantageous that the heat dragging is parallel to the direction of orientation of the film material as it has been found that heat-dragging parallel to the direction of orientation is easier than heat-dragging under a pronounced angle to this direction, and also easier than with unoriented material.

If the abovementioned air-cooling (41) of the discharging zone is omitted, protruding naps will normally not be the result, but the described process still provides for a most practical way of producing netlike products.

Figure 8:
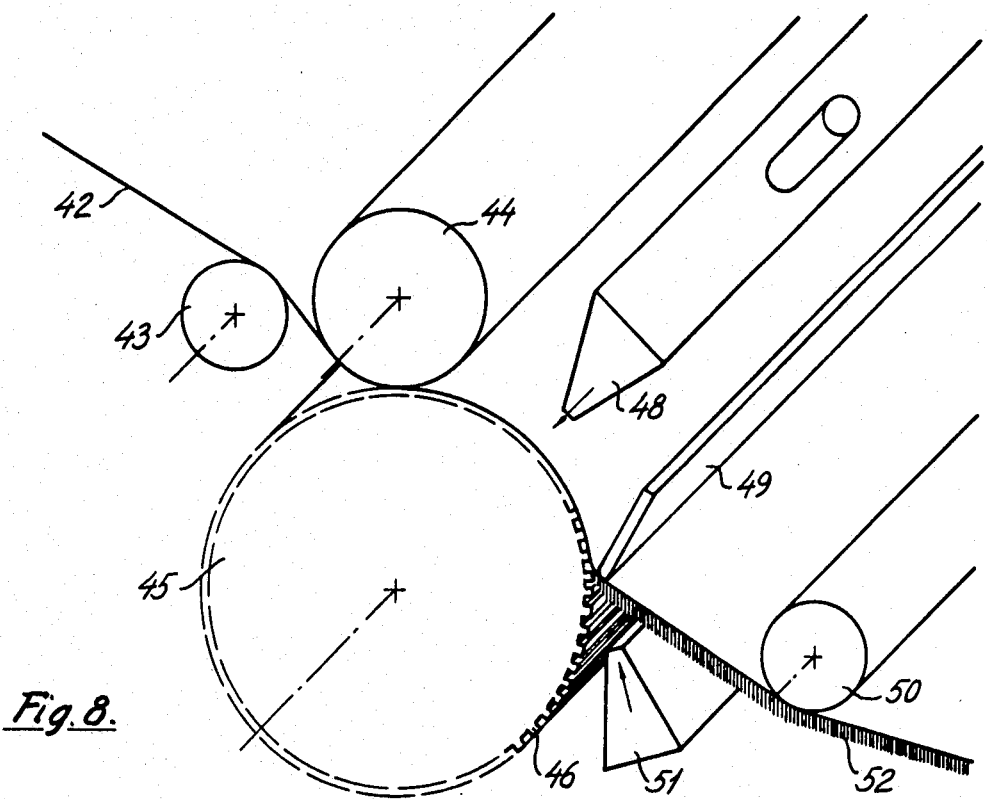
FIG. 8 shows another preferred device for producing the product as generally shown in FIG. 5 and more particularly with the special fiber forms shown in FIG. 10 or 11.

The process line of FIG. 8 is essentially like that of FIG. 6 (and also devised for film with higher melting filaments incorporated), but designed for a more precise and controlled formation of the nap.

The film (42) with longitudinal reinforcement filaments of higher melting polymer (not apparent in FIG. 8) is taken over a guide roller (43) onto a water-cooled roller (44) which has a semi-hard surface (e.g. polytetrafluorethylene reinforced with fabric) which has the function to act as backing for the initial embossment. Roller (44) carries the film into the nip which it forms with the embossed roller (45) rotating with the same circumferential velocity as roller (44) and having linear bosses (46) generally perpendicular to the machine direction of the film, i.e. to the incorporated filaments.

The embossed roller (45) is heated evenly to a temperature above the melting point of the matrix film polymer. The main bosses are supplied—as shown in the detail drawing FIG. 9—with a fine subembossment, preferably (as shown) forming relatively sharp points (47) and further (as also shown) adapted to produce a criss-crossing pattern of fine pyramidal bosses on the heated portions of the film. The film is heated where it is attached to the bosses (46) but maintained relatively cold at the portions which are adjacent to the grooves. In order to reach a convenient temperature with a relatively high throughput, the film thereafter follows the hot embossed roller over a substantial part of its circumference, while a jet (48) blows on air—as shown by the arrow—in order to maintain the temperature low at those portions which are not in direct contact with the embossed roller.

The film is thereafter withdrawn by pulling over a bar (49) with a relatively sharp edge at a short distance from the surface of the roller, and is guided by roller (50), while extra air is blown directly from nozzle (51) into the gap where the nap is formed.

Figure 10:
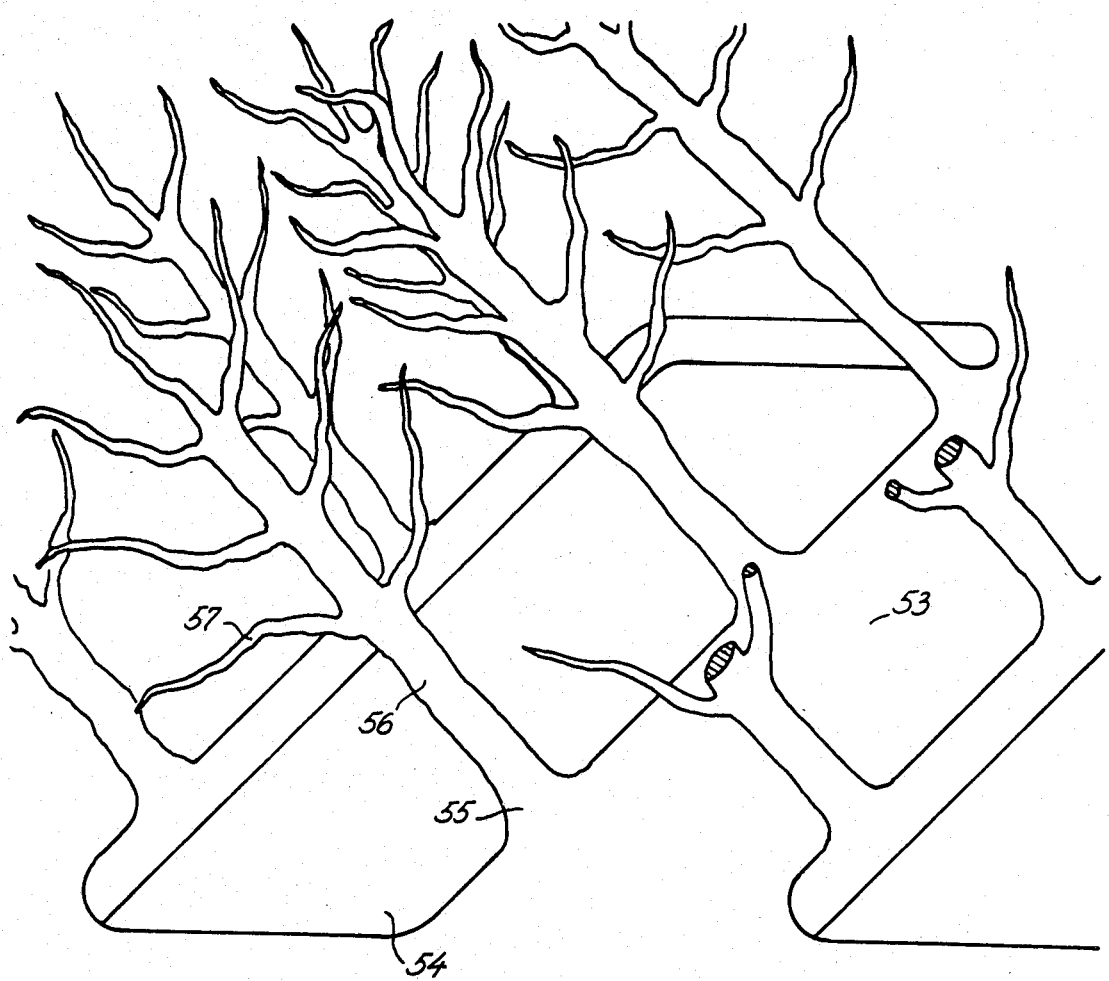
FIG. 10 shows a branched nap on a net according to the invention.

FIG. 10 shows branched protruding fibres. (53) is a portion of the base net from which the fibres protrude, and (54) an aperture defined by a mesh of this net. At a point (55) on (53) adjacent to the hollow (54) a fibre (56) protrudes. The fibre has branches (57).

Figure 11:
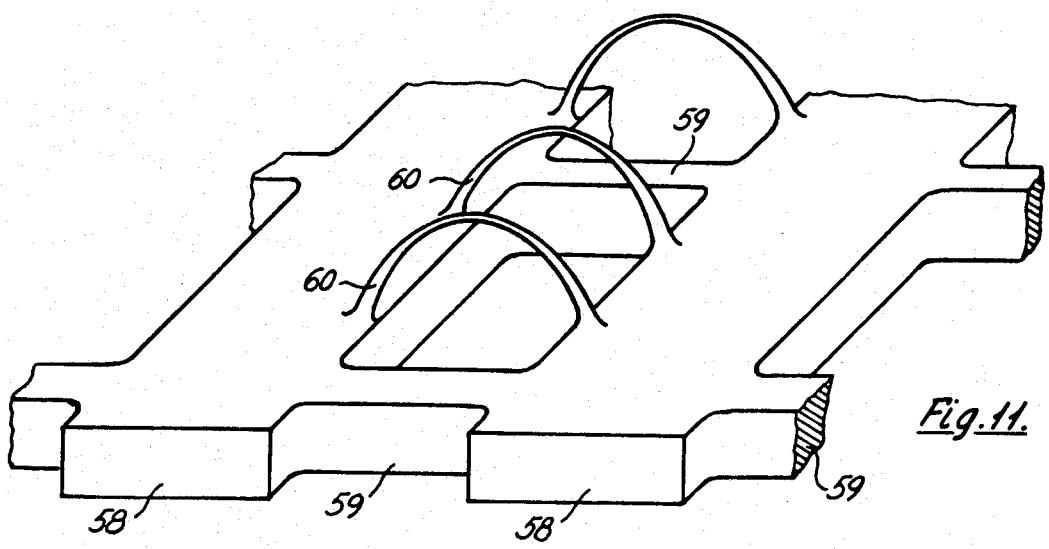
FIG. 11 shows a loop-formed, bridging nap on a net according to the invention.

FIG. 11 shows fibres in a loop-formed bridging arrangement. The base net consists of the portions (58) which were kept relatively cold during the heat-dragging, and the intervening portions (59) formed of the higher melting incorporated filaments (not shown) and matrix film polymer which has stuck to the solid filaments during the heat-splitting. The protruding fibres (60) form loops and bridge over two adjacent parallel portions of the net.

It is to be understood that the protruding fibres are extensions of the margins of portions (58) and at the start of the protrusion have the same thickness as these edge-portions. The bridging fibres (60) are tapered like the other protruding fibres, but in this case they are thinnest at the middle.

Fibres (60) can have branches like in FIG. 10, and can even be totally interconnected to a branched web.

Figure 9:
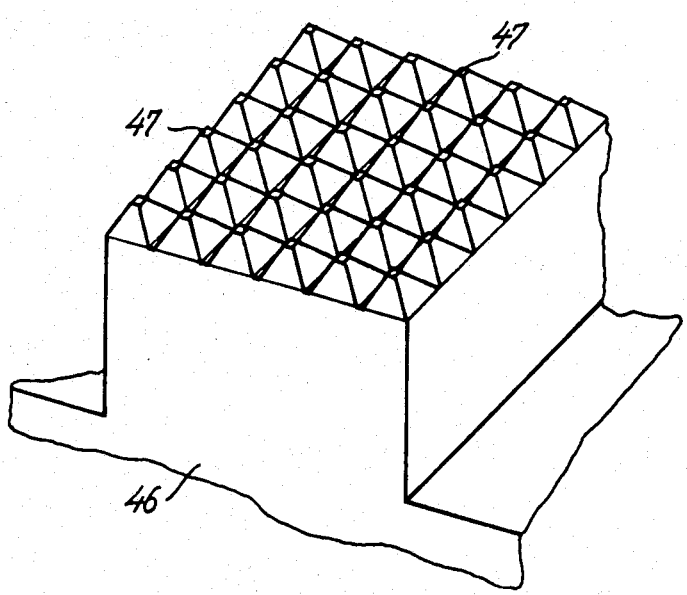
FIG. 9 shows in enlarged scale a part of FIG. 8.

The embossment pattern of FIG. 9 will normally produce the branched fibres of FIG. 10. However, at a relatively low temperature at which the probability of rupture is reduced (but still in at least partly molten state) they can produce bridging fibres like in FIG. 11, but at the same time branched. The non-branched bridging fibres of FIG. 11 are produced under similar circumstances, but with a one-directional sub-embossment pattern instead of the criss-crossing pattern produced by the device shown in FIG. 9.

When the heat-dragging is carried-out at such relatively low temperatures, it may be necessary to use lower melting polymers—which may be applied in very small amounts—to improve the adhesive bonding between the film and the bosses (46). Such material may be applied as layers by coextrusion or may be dusted unto the embossed roller.

Like most other methods to produce net from film, the present method has a tendency to result in a structure with scratchy feel. This is mainly due to the feel of the edges of the flat (generally ribbonformed) netportions when the skin is rubbed over the surface of the structure, but is also due to the prickle-form of the fibres at their protrusion locations. However, this draw-back can be minimised by several measures taken alone or in combination, viz.:

using very thin film, e.g. 10–20 gr per sq. m.,
carrying out the heat-dragging at the lowest possible temperature,
retaining sufficiently wide and close interconnections in the base net,
using the product in laminated form, e.g. spot-glued, so as to eliminate the possibility for the ribbon-formed portions to turn on edge.

The napped scrim according to the invention can with particular advantages be used in combination with cellulosic fibres for diapers and other textiles. The scrim is then applied so as to face the body, whereby there is made use of the pleasant feel caused by the nap. At the same time it serves as reinforcement. When used as outer layer in diapers and other materials to absorb the fluid discharges from a human or animal body, it will be preferable to produce the napped scrim from a pronouncedly hydrophobic polymer, in particular a polyolefin such as polypropylene. Provided the density of the nap is not exagerated, the hydrophobicity will not prevent the fluid discharges from passing through and being absorbed in the cellulosic fibres, but will make the sanitary textile with its web contents feel dryer. It will also prevent coagulated blood etc. from sticking to the textile.

The scrim can also be used for non-woven apparal, either facing the body or as interlining, where the nap serves as heat insulator, or at the outside of apparel with a fur-like effect. For such purpose, it is preferably produced from a tougher type of polymer such as a polyamide or polyethylene terephthalate.

It can also in several cases with advantage be produced from e.g. polyvinylchloride or polyvinylidene-chloride, or copolymers between the latters. On principle, any thermoplastic film and fiber-forming polymer can be applied.

In order to increase the tendency to form fibres by the dragging in molten state and to improve the look of the nap, the film used for the scrim production may with advantage be a slightly expanded (foamed) film.

Further examples of suitable uses of the napped net according to the invention are as follows:
for blankets, preferably in form of a laminate of several layers napped net,
for wiping cloth—alone or as a layer,
as a layer or layers in carpet backing,
for filter material,
as paper reinforcement,
as scrim reinforcement for turf and the like.

EXAMPLE

Flat threads of nylon 6 (1 part by weight) are coextruded in a 300 gr per sq m polypropylene (10 parts by weight) film wholly surrounded by the polypropylene. Distance from center to center of the threads: 0.8 mm. Thickness of the film: 300 gr per sq m. Melt flow index of polypropylene: 5 according to ASTM condition L. Melt flow index of nylon: adjusted to give distinct but flat filaments in the coextrusion.

The film was stretched at ratio 2:1 in the length and 7.5:1 in the transverse direction. It was then taken through the line shown in FIG. 8. Temperature of the embossed roller was kept between the melting points of the two polymers, while the exact adjustment of this and the air jets were adjusted by experimenting and observing the results obtained.

What I claim is:

1. Textile-like reticular product comprising a perforated plastic film wherein said perforations extend through said film and are arranged in a predetermined pattern, and projecting exteriorly from one surface of said film multitudinous filaments or threads of the same plastic as said film and having base ends merging integrally with the side margins of each of said perforations with a length greater than any dimension of the corresponding perforation, the regions of said film side intervening between said margins of said perforations being at least substantially free of said filaments or threads.

2. The product of claim 1 wherein said filaments or threads extending at opposite ends from different sides of said perforations in generally loop-like fashion bridging said perforations.

3. The product of claim 1 wherein a substantial part of said filaments or threads branch along their length.

4. The product of claim 3 wherein at least some of said filaments or threads are interconnected with at least one other filament or thread by common branches.

* * * * *

UNITED STATES PATENT AND TRADEMARK OFFICE
CERTIFICATE OF CORRECTION

PATENT NO. : 4,636,417
DATED      : January 13, 1987
INVENTOR(S) : Ole-Bendt Rasmussen It is certified that error appears in the above-identified patent and that said Letters Patent is hereby corrected as shown below:

In the Heading:

The following should be inserted:

-- [30]  Foreign Application Priority Data

Feb. 19, 1985 [GB]   United Kingdom ..... 53268/74 --.

Signed and Sealed this

Twenty-eighth Day of April, 1987

Attest:

DONALD J. QUIGG

Attesting Officer      Commissioner of Patents and Trademarks